Figure 2:
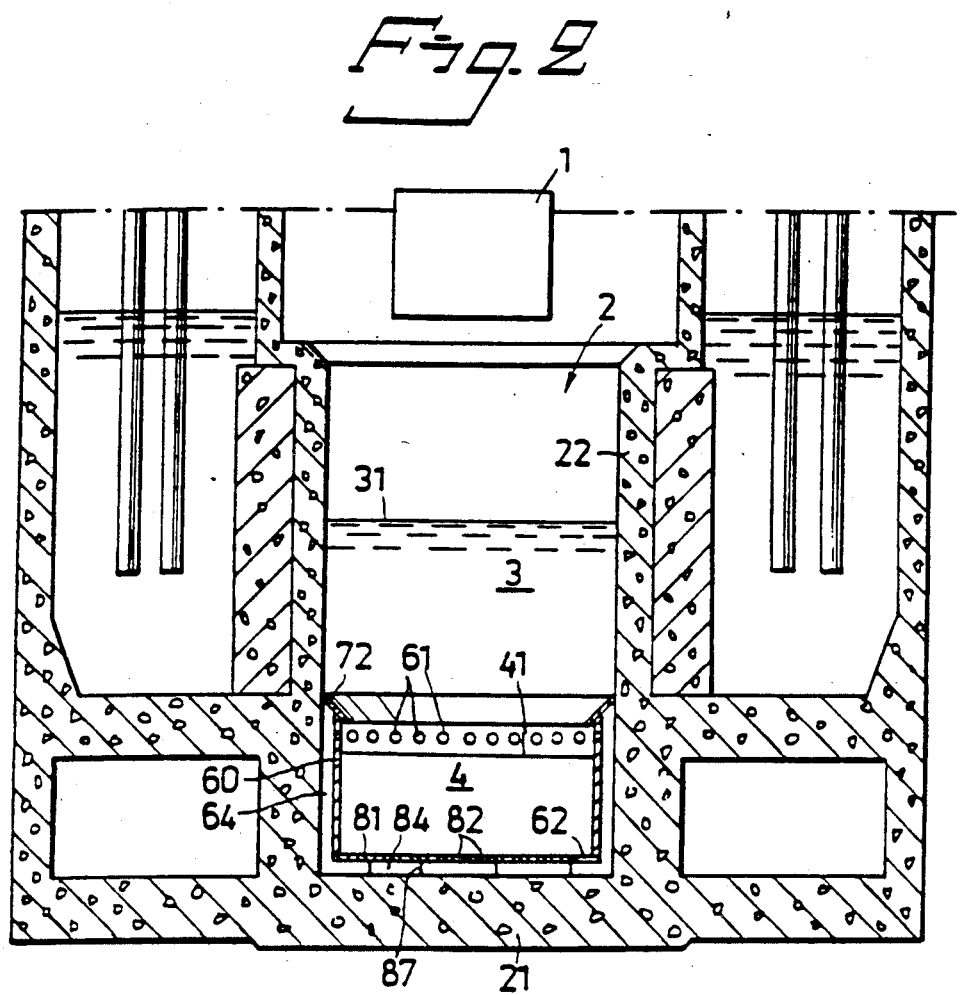

United States Patent [19]
Becker et al.

[11] Patent Number: 5,192,494
[45] Date of Patent: Mar. 9, 1993

[54] ARRANGEMENT FOR PROTECTING REACTOR CONTAINMENT INTEGRITY

[76] Inventors: Kurt M. Becker, Illerstigen 16, S-171 71 Solna; Johan Engström, Dalagatan 62, S-113 24 Stockholm, both of Sweden

[21] Appl. No.: 752,517
[22] PCT Filed: Mar. 7, 1990
[86] PCT No.: PCT/SE90/00147
 § 371 Date: Aug. 29, 1991
 § 102(e) Date: Aug. 29, 1991
[87] PCT Pub. No.: WO90/10936
 PCT Pub. Date: Sep. 20, 1990

[30] Foreign Application Priority Data

Mar. 10, 1989 [SE] Sweden .................. 8900843

[51] Int. Cl.⁵ ............................................. G21C 9/016
[52] U.S. Cl. ......................... 376/280; 976/DIG. 143
[58] Field of Search .............. 376/280; 976/DIG. 143

[56] References Cited

U.S. PATENT DOCUMENTS

| | | | |
|---|---|---|---|
| H,91 | 7/1986 | Gabor et al. | 376/280 |
| 4,116,764 | 9/1978 | Jones | 376/280 |
| 4,280,872 | 7/1981 | Ferrari et al. | 376/280 |

Primary Examiner—Daniel D. Wasil
Attorney, Agent, or Firm—Ostrolenk, Faber, Gerb & Soffen

[57] ABSTRACT

A penetration (51) through the bottom of a pool in the reactor containment below a reactor vessel is protected against the effects of a core meltdown, by the penetration (51) being surrounded by a pipe (60) having an inlet (61) located below the surface (31) of the water and above the highest level (41) which the bed (4) of granulate formed by the descending molten core material could be expected to reach. The pipe (60) has an outlet (62) at its lower end, located in the bed (4). The gap (64) between the penetration (51) and the pipe (60) is covered by a screen (7) which prevents granulate from entering. Granulate is also prevented from entering the outlet (62). The pool water flows in through the inlet (61), down through the gap (64), out through the outlet (62) and into the particle bed (4) where the water is vaporized and rises through the bed without obstructing the flow of water through the gap for cooling the penetration. The pipe (60) prevents contact between the particle bed (4) and the penetration (51). Said pipe is cooled by the flow of water through the gap (64) and promotes improved cooling of the particle bed.

7 Claims, 2 Drawing Sheets

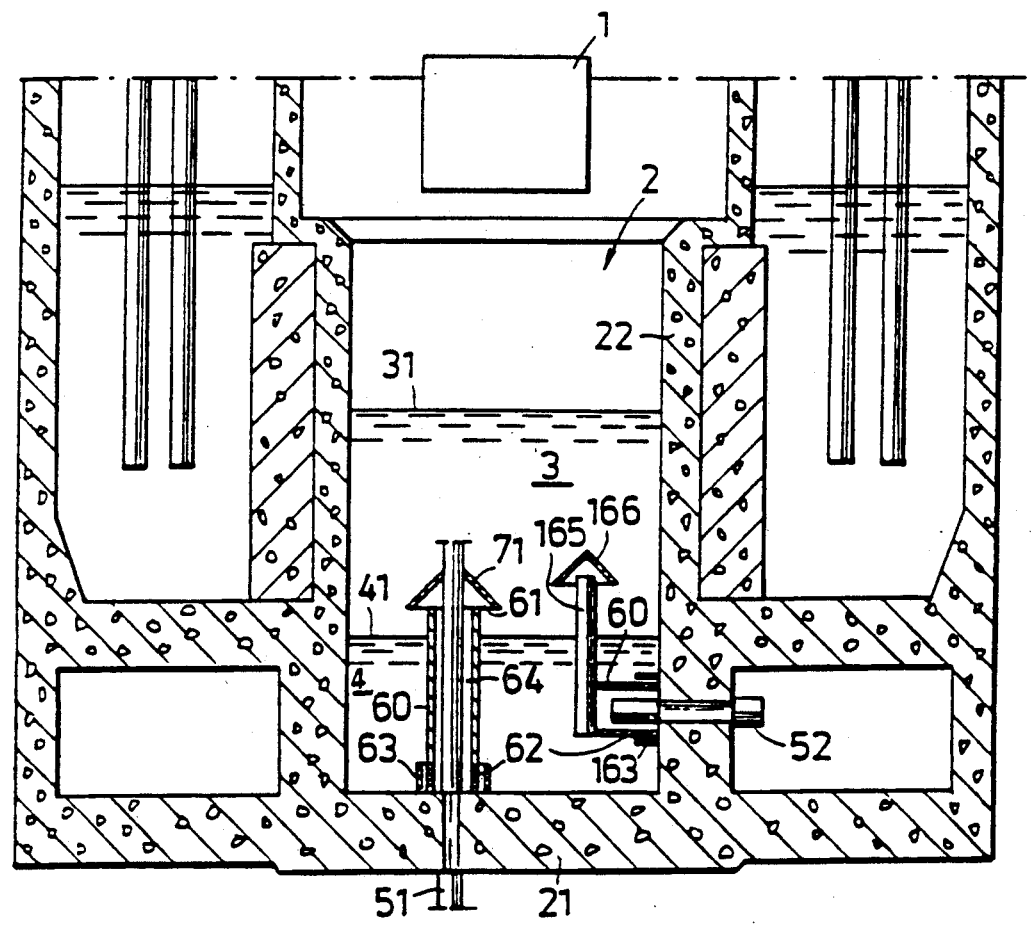

ARRANGEMENT FOR PROTECTING REACTOR CONTAINMENT INTEGRITY

The invention relates to an arrangement for protecting a cylindrical surface in a nuclear reactor containment against the effects of a core meltdown, the surface being located below the reactor vessel in a pool intended to be filled with water in order to granulate and cool molten core falling into it.

In many types of reactors, if the core melts in a reactor accident and penetrates through the bottom of the reactor vessel, the molten core material will run down into a pool in the reactor containment. This is the case, for instance, in the type of reactor represented by the boiler reactors Oskarshamn 3(O3) and Forsmark 3(F3) in Sweden. In these reactors the central space below the reactor vessel is dry during normal operation, but in the event of an accident this space will be filled with water from a surrounding pool before the molten core penetrates the bottom of the reactor vessel.

It is known from many industrial processes and from laboratory experiments that when a melt runs down into water it is fragmented into particles which solidify on their way through the water, thus forming a bed of particles at the bottom of the pool. The particles vary in size. Normally, approximately 98-99% of the bed mass will consist of particles having equivalent diameters between 1 and 12 mm. However, in certain cases steam explosions may occur and particles are then obtained which may be smaller than those obtained at normal fragmentation.

The molten core material will form a particle bed of up to 25-30 m$^3$ on the concrete floor of the reactor containment if the whole reactor core melts. Due to the high radioactivity of the core granulate enormous quantities of heat are generated in the bed, which must therefore be cooled if melting is to be avoided. Melting occurs at about 2000° C. and a meltdown at this temperature would seriously damage the concrete and rapidly destroy the penetrations of steel or the like located in the floor and possibly also in the walls of the water pool. This would cause severe and unacceptable radioactive emission.

The particle bed is cooled by water from the pool penetrating the bed from above. The water boils in the bed, forming steam which flows up through the bed and condenses in the water mass above the bed. If the bed containing small particles, is too high, or generates too much energy, the upwardly flowing steam will prevent the water from penetrating down through the bed. This phenomenon is known as dryout and means that the particle bed dries out and is heated to melting point which, as mentioned, results in concrete attack and destruction of penetrations. Reactor containment integrity is lost, with severe radioactive emission as a result.

The object of the invention is to offer an arrangement by means of which the integrity of the reactor containment can be maintained in the event of an accident of the type mentioned. A specific object of the invention is to provide an arrangement which protects the penetrations, but the invention is also aimed at offering an arrangement which will protect the bottom and walls of the pool against attack from the bed.

For this purpose the invention offers an arrangement for protecting a tubular surface (e.g. a penetration or the side wall of the pool) in a nuclear reactor containment against the effects of a core meltdown, the surface being located below the reactor vessel in a pool intended to be filled with water in order to granulate and cool molten core material falling into it. The arrangement is substantially characterised by a pipe or a tubular element located on the side of the tubular surface to be protected, thereby forming a gap between the surface and the pipe, the pipe having an inlet located below the surface of the water in the pool and above the highest level in the pool which granulate could be expected to reach, an outlet in the pipe communicating with the lower part of the pool, so that water is permitted to pass via the inlet, the gap and the outlet to the lower part of the granulate bed, and by screen devices preventing granulate from entering the gap.

The tubular surface to be protected may thus be a penetration or a pipe through the bottom or side wall of the pool. Alternatively the tubular surface may constitute the side wall of the pool itself.

According to a further development of the invention, the bottom of the pool may be lined with a perforated bottom wall to form a bottom gap between the bottom of the pool and the bottom wall, the perforations in the bottom wall then communicating with the gap below.

The protective devices may comprise a screen over the inlet to the gap, said screen preventing granulate from falling directly into the gap. The protective device may even comprise a grating or the like covering the outlet from the gap or the pipe to the granulate bed to prevent granulate particles from entering and blocking the gap. Alternatively the protective device at the outlet may consist of slits in the pipe or of a labyrinth or the like.

The invention is defined in the appended claims.

It has been discovered that the dryout effect for particle beds can be increased by a factor of up to 3 if counter flow is avoided between steam and water through the particle bed. This can be achieved by placing vertical pipes in the pool, the pipes having an inlet located above the surface of the bed and below the surface of the water, and an outlet (e.g. in the form of axial slits in the lower end of the pipe) at the bottom of the pool. Water will thus run down through the pipe, permeate into the bed and form steam which will pass up through the particle bed without impeding the downward flow of water through the pipe. However, these simple pipes are not sufficient if the granulate bed is formed of layers with relatively small particles on top of a layer of relatively large particles; such bed structures cannot be entirely excluded since they may be formed by particles from small steam explosions settling on top of particles formed by normal hydrodynamic fragmentation. If the bed were to be cooled only by pipes extending down through the particle bed, the integrity of the penetrations of steel in the concrete floor of the pool might be endangered. However, this problem is solved according to the invention by arranging the pipes around the penetrations, thus preventing the penetrations from coming into direct contact with the core granulate and also ensuring that they are cooled by the water flowing down through the gap. Of course, an equivalent arrangement is possible for the side wall of the pool. In both cases the bottom of the pool can be protected by a bottom wall such as that described above. In the case of reactors with relatively small pool area, the granulate bed will be relatively deep and therefore difficult to cool. In such situations it is particularly suitable to allow the pipe to communicate with a bottom gap between the bottom of the pool and the bottom wall, as well as when the penetrations extend through the side wall of the pool, spaced from the bottom of the pool.

The invention will be described in the following by way of example with reference to the accompanying drawings.

Figure 3:
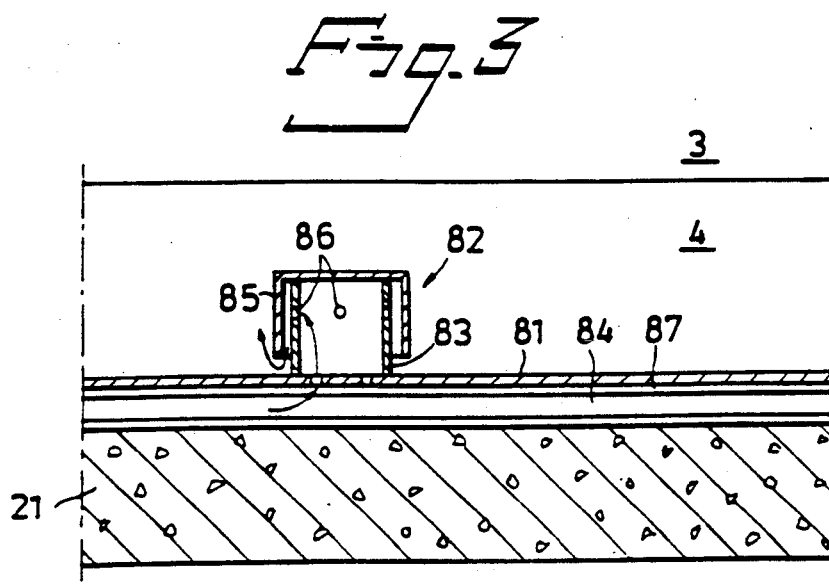

FIG. 1 shows schematically a section through a reactor containment with the protective arrangements according to the invention for vertical and horizontal penetrations, FIG. 2 shows schematically a vertical section through a reactor containment and illustrates a protective arrangement according to the invention for the side wall and bottom of the pool, and FIG. 3 shows a detail of the protective arrangement for the bottom of the pool.

FIG. 1 shows schematically an example of a reactor containment. The reactor vessel is indicated schematically by 1 and is located above a pool 2 which, in the event of an accident, is filled with water 3 to a level indicated by 31. Molten core material running down from the reactor vessel 1 will granulate in the water 3 and form a bed 4 of granulate, the highest expected level of which is indicated by 41. A vertical penetration 51 is shown extending through the floor 21 of the pool 2, and a horizontal penetration 52 is shown extending through the side wall 22 of the pool 2.

A pipe 60 surrounds the penetration 51 and is provided with a water inlet 61 located at a level between the levels 41 and 31, and an outlet 62 located in the lower part of the pool 2, in the bed 4. A conical screen 71 covers the upper end of the gap 64 between the penetration 51 and the pipe 60 in order to prevent granulate on its way down from entering directly into the gap 64. The outlet 62 may be in the form of slits in the lower end of the pipe 60, said slits being shaped to prevent particles from entering the gap, or being covered by a suitably fine-meshed net. The pipe 60 prevents direct contact between the bed 4 and the penetration 51 and, together with the penetration 51, forms an annular gap through which water flows in downward direction, leaving through the outlet 62 to be vaporized in the bed 4. The steam produced in the cooling process rises and condenses in the water layer 3 above the bed 4.

The horizontal penetration 52 is surrounded in the pool 2 by a horizontal pipe 60 provided with outlets 62 close to the wall 22. Particles from the bed 4 are prevented from entering the outlets 62 by a covering ring 163. The other end of the pipe 60 is connected to a vertical riser 165 emerging between the levels 41 and 31. The inlet to pipe 165 is provided by a cowl 166 preventing granulate from flowing directly in.

FIG. 2 shows schematically an alternative or a supplement to one or both the protective arrangements shown in FIG. 1.

The protective arrangement according to FIG. 2 comprises a tubular sheet metal casing covering the side wall 22 of the pool from the bottom 21 up to a level above the level of the granulate 41, forming a gap 64. The tubular casing 60 is provided with an inlet 61 between the levels 41 and 31, and an outlet 62 at the floor of the pool. The gap 64 is also protected by a conical sheet-metal screen 72 which prevents granulate from directly entering the gap. Granulate is also prevented from entering the outlet 62.

In a further development of the invention the floor of the pool 21 is covered by a bottom plate 81 with outlets 82 for water to the bed 4. Together with the bottom 21 of the pool, the plate 81 forms a gap 84. The plate 81 may be supported by beams or supports 87, indicated schematically, raising it from the floor 21. The gap 84 can be supplied with water through the gap 64, the water flowing out through the openings 82 to cool the particle bed and the plate 81 preventing direct contact between the particle bed and the floor 21 of the pool.

As shown in FIG. 3, the water outlets through the floor plate 81 may be formed by upwardly directed pipe connections 83 provided with one or more openings 86 through their walls and covered by a lid 85, the free edge of which is at a level below the level from the opening 86, thus forming a labyrinth which prevents particles from the bed 4 from entering the water gap 84.

We claim:

1. An arrangement for protecting the integrity of a nuclear reactor containment, the arrangement comprising:

the nuclear reactor containment including a reactor vessel for containing a nuclear reactor core, a pool beneath the reactor vessel for receiving molten core material from the vessel, the pool being adapted to be filled with water to cool and granulate molten core material which may descend from the reactor vessel during a core meltdown to form a granulate bed of the core material in a lower part of the pool;

a tubular surface penetrating into the pool of the nuclear reactor containment and below the reactor vessel;

a pipe around the tubular surface and being so sized and separated from the tubular surface as to define a gap between them for the pipe to protect the tubular surface from the effects of the core meltdown; the pipe having an upper end and a first opening in the pipe at the upper end, the first opening being located below the height of the surface of water that will enter the pool on a meltdown and above the highest level in the pool which the granulate bed could be expected to reach; the pipe having a lower end and a second opening at the lower end, the second opening being located at the height in the pool as to be in the granulate bed, and the second opening communicating with the lower part of the pool so that water flowing into the gap through the first opening flows through the gap around the tubular surface and out through the second opening into the granulate bed to cool the granulate bed.

2. The arrangement according to claim 1, further comprising a screen device at the first opening of the pipe to prevent granulate material from entering the pipe.

3. The arrangement according to claim 2, further comprising a screen device at the second opening the pipe to prevent granulate material from entering the pipe.

4. The arrangement according to claim 2, wherein the pool further has a bottom wall which would support the granulate bed, and the tubular surface comprises a penetration through the bottom wall of the pool into the pool.

5. The arrangement according to claim 2, wherein the pool further has a side wall and the tubular surface comprises a penetration through the side wall of the pool into the pool.

6. The arrangement according to claim 2, wherein the tubular comprise the side wall of the pool.

7. The arrangement according to claim 6, further comprising a first perforated bottom wall which is above and separated from a second bottom wall to define a bottom wall gap, the first bottom wall being adapted for supporting the granulate bed, while the perforations in the first bottom wall form outlet from the bottom wall gap into the granulate bed so that water flowing into the gap through the first opening in the pipe flows through the gap between the tubular surface and the pipe and then into the bottom wall gap and into the granulate bed.

* * * * *